(No Model.) 8 Sheets—Sheet 1.
P. KENNEDY.
MACHINE FOR PUNCHING NOTE PLATES OR NOTE BARRELS.

No. 545,896. Patented Sept. 10, 1895.

WITNESSES:

INVENTOR
Patrick Kennedy,
BY Briesen & Knauth
ATTORNEYS.

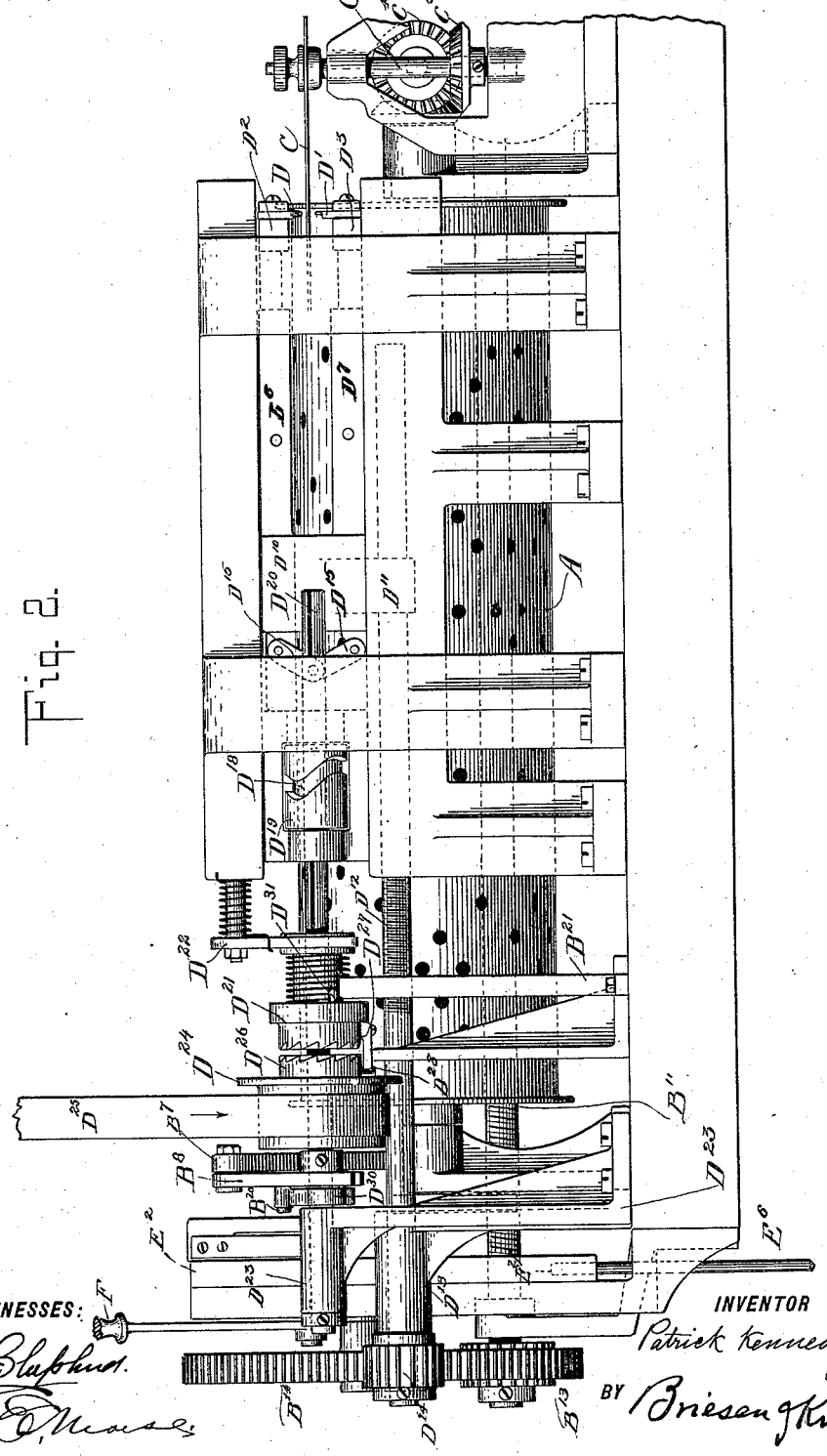

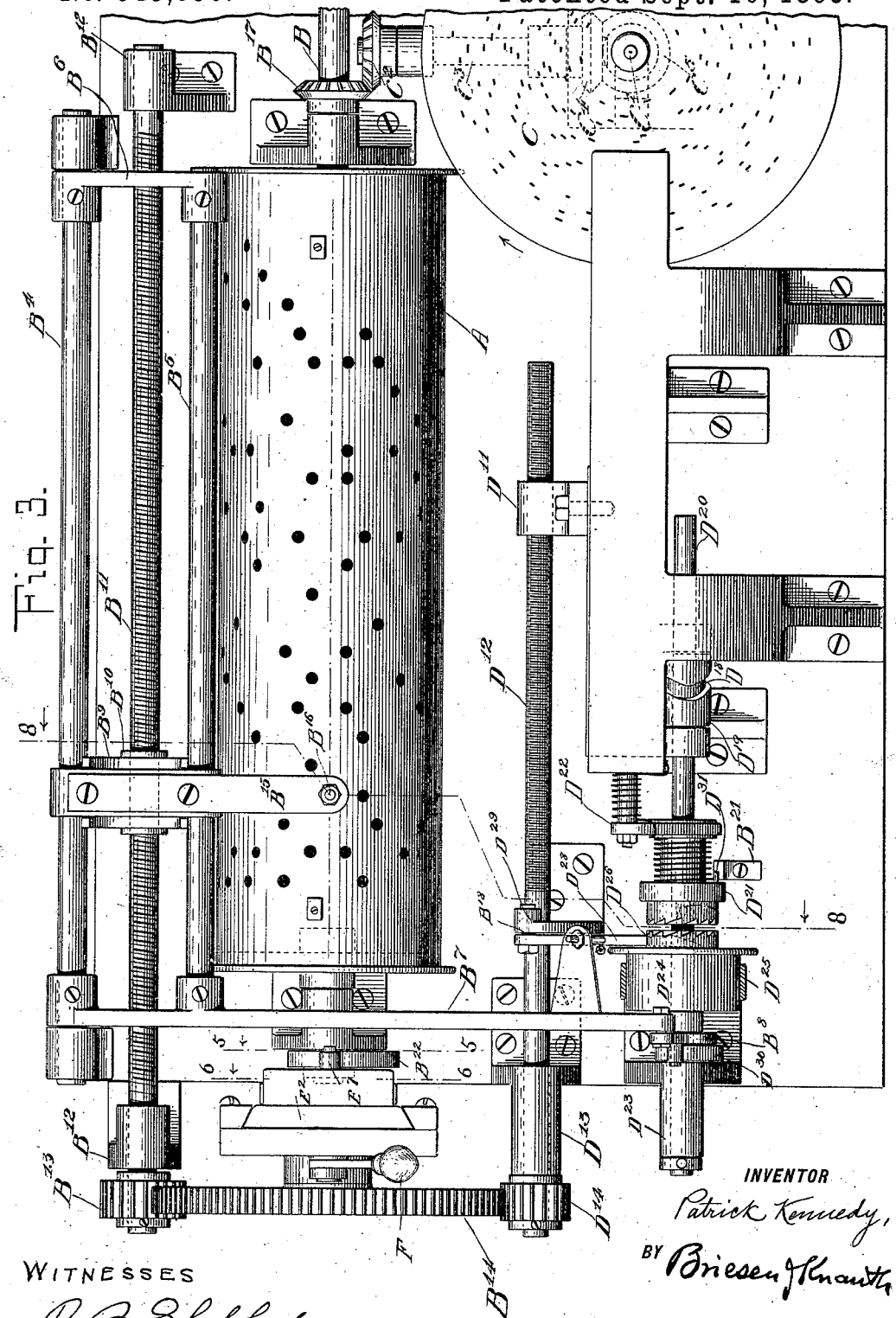

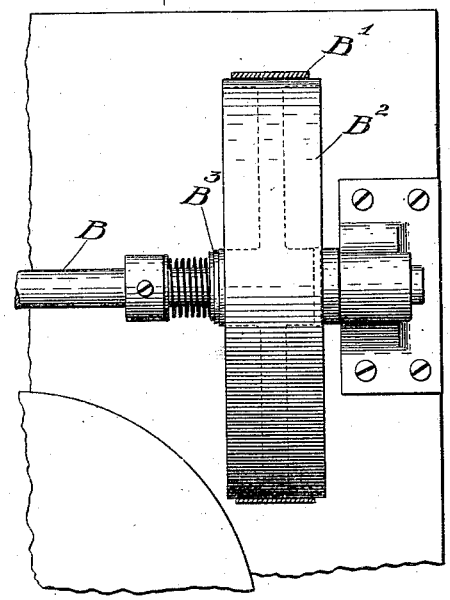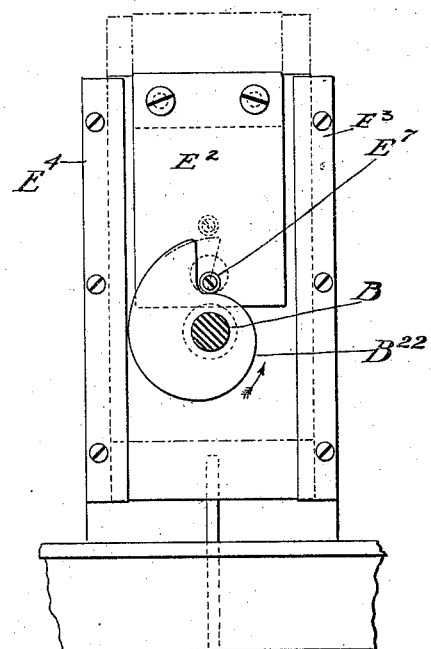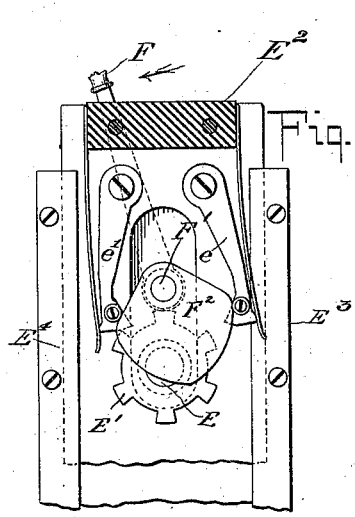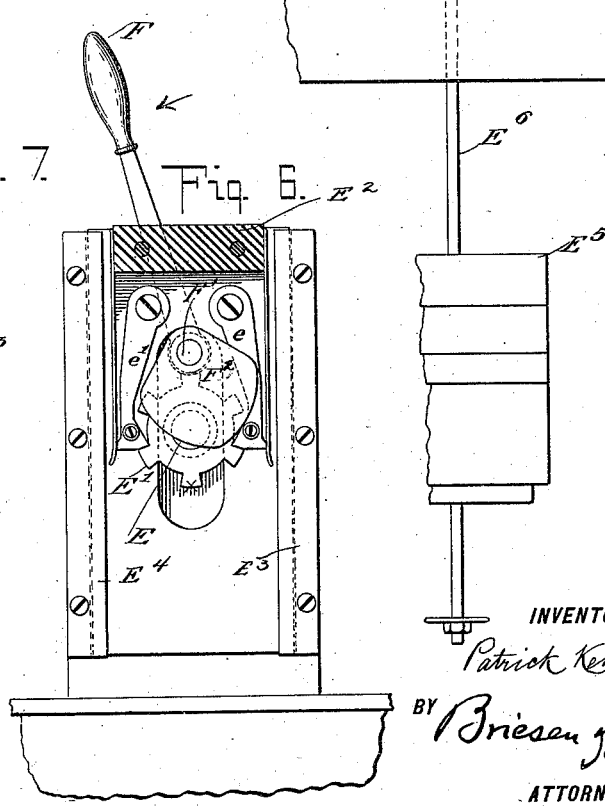

(No Model.) 8 Sheets—Sheet 5.
P. KENNEDY.
MACHINE FOR PUNCHING NOTE PLATES OR NOTE BARRELS.
No. 545,896. Patented Sept. 10, 1895.
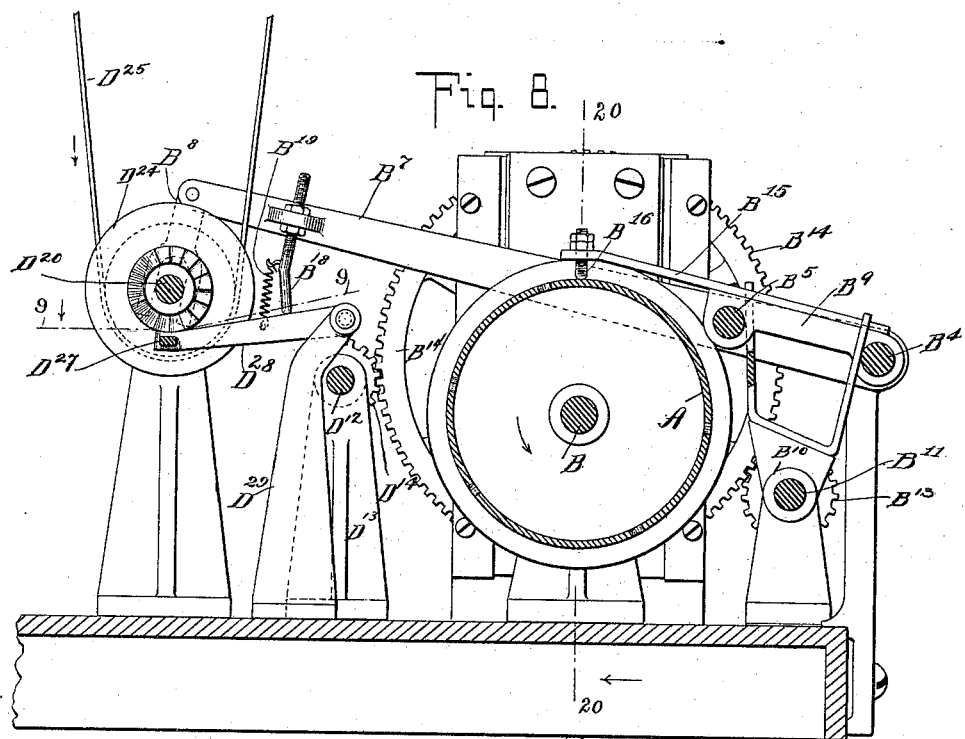
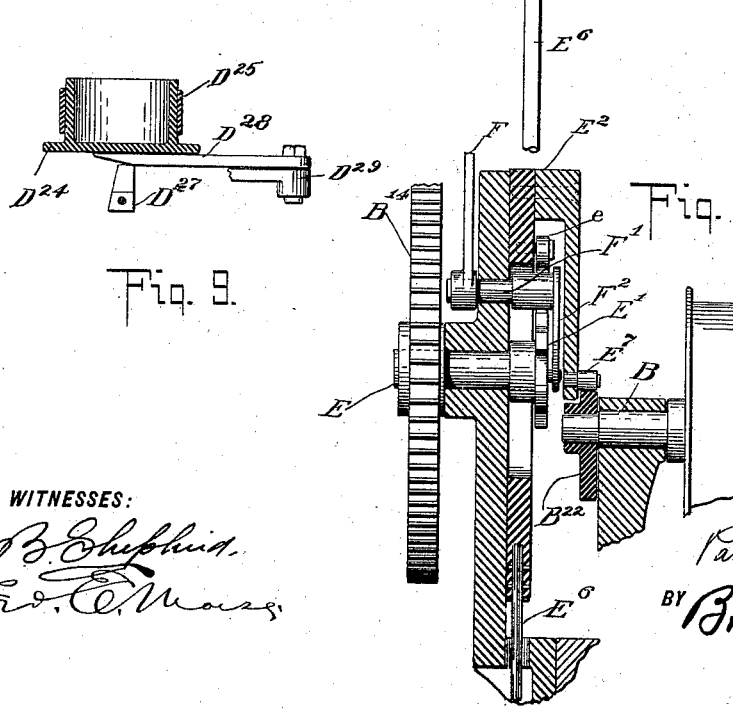
WITNESSES:
INVENTOR
Patrick Kennedy,
BY Briesen & Knauth
ATTORNEYS.

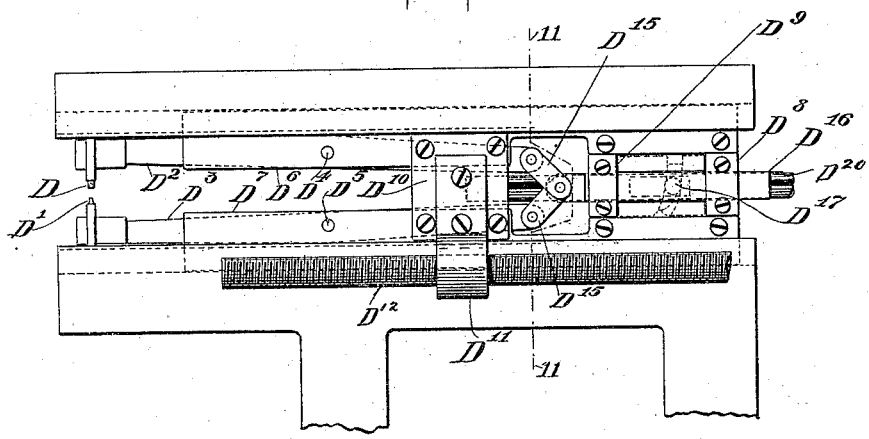
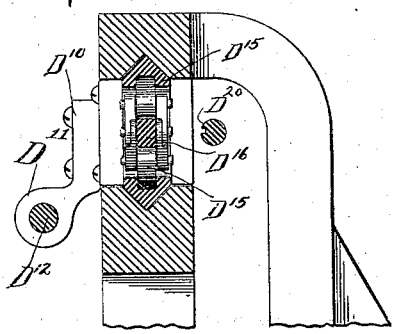
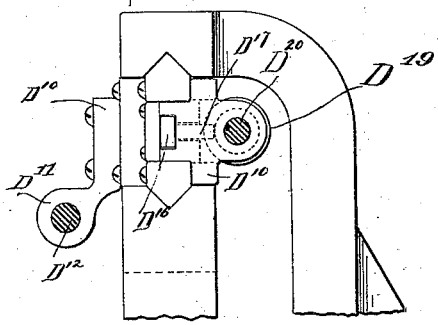
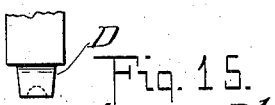
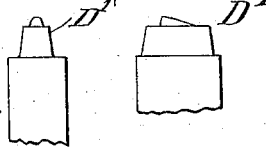

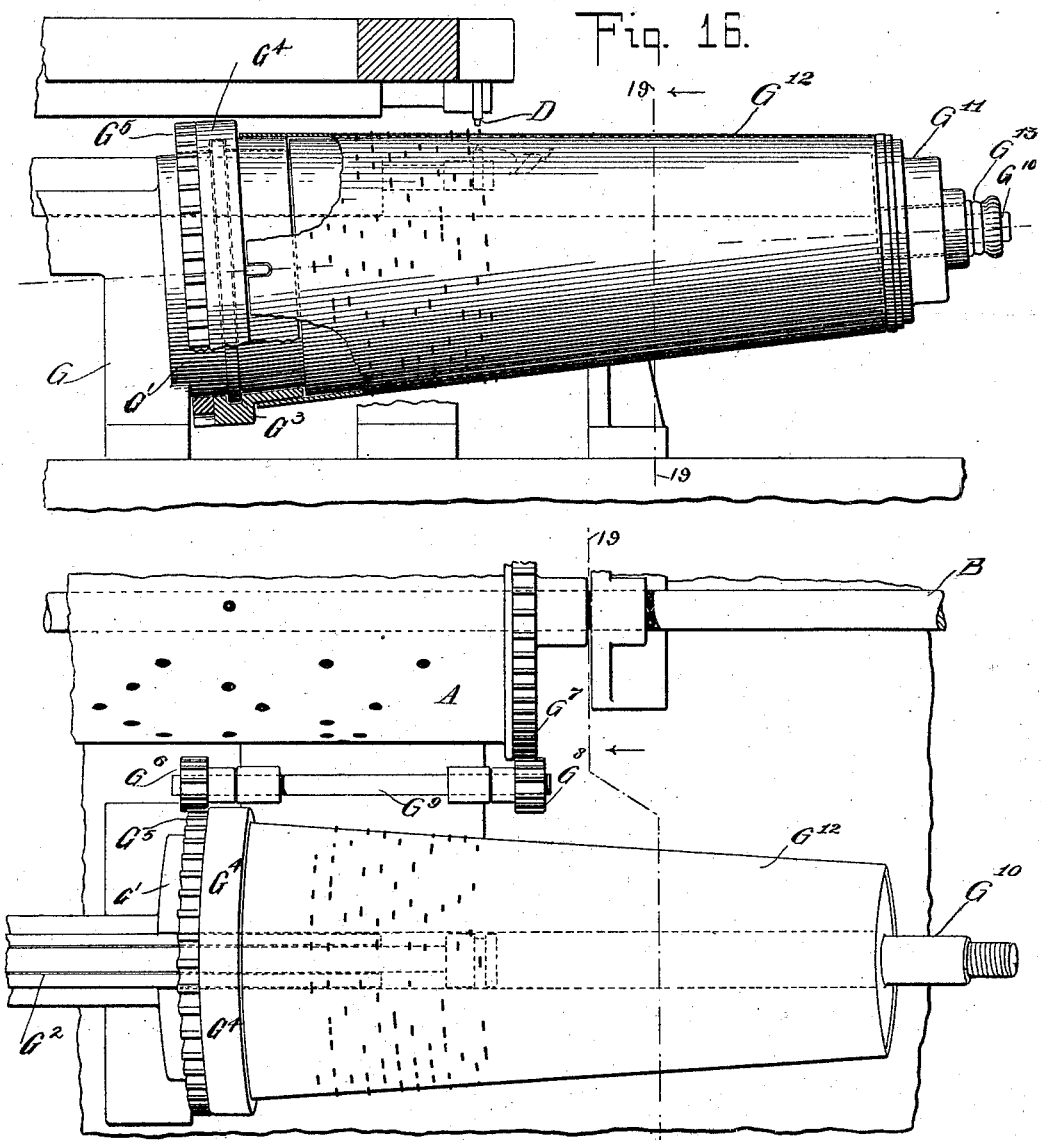

(No Model.)  
P. KENNEDY.  
MACHINE FOR PUNCHING NOTE PLATES OR NOTE BARRELS.  
No. 545,896. Patented Sept. 10, 1895.

WITNESSES:

INVENTOR  
Patrick Kennedy,  
BY  
ATTORNEYS.

UNITED STATES PATENT OFFICE.

PATRICK KENNEDY, OF BROOKLYN, NEW YORK, ASSIGNOR TO F. G. OTTO & SONS, OF JERSEY CITY, NEW JERSEY.

MACHINE FOR PUNCHING NOTE-PLATES OR NOTE-BARRELS.

SPECIFICATION forming part of Letters Patent No. 545,896, dated September 10, 1895.

Application filed September 25, 1894. Serial No. 524,052. (No model.)

*To all whom it may concern:*

Be it known that I, PATRICK KENNEDY, residing in Brooklyn, county of Kings, and State of New York, have invented certain new and useful Improvements in Machines for Punching Note-Plates or Note-Barrels, of which the following is a full, clear, and exact description.

My invention relates to machines for forming notes or playing devices in note-plates, note-barrels, and the like which are designed for use in music-boxes of the self-playing variety.

My invention consists in the construction and arrangement of devices hereinafter set forth and claimed.

My invention will be understood by reference to the accompanying drawings, wherein—

Figure 1:
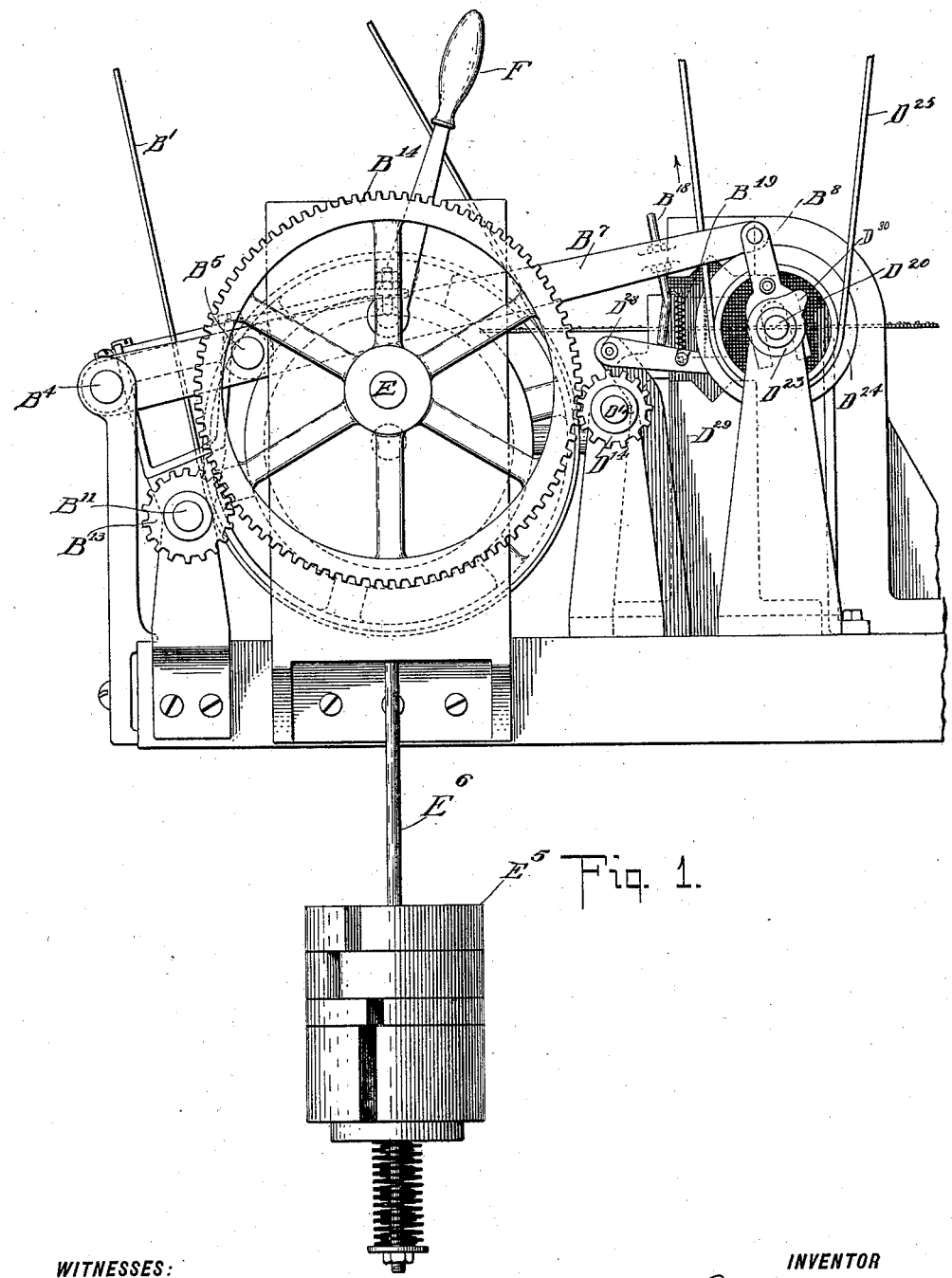
Figure 18:
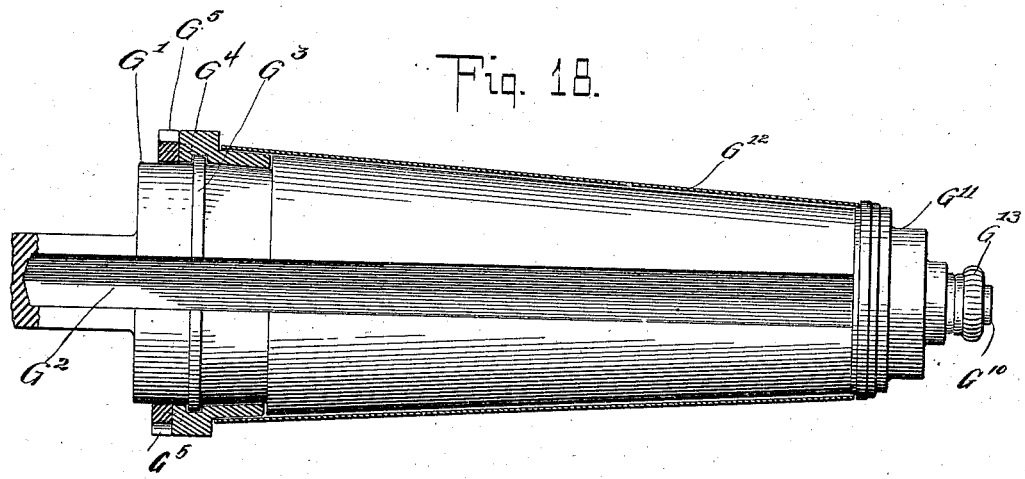
Figure 19:
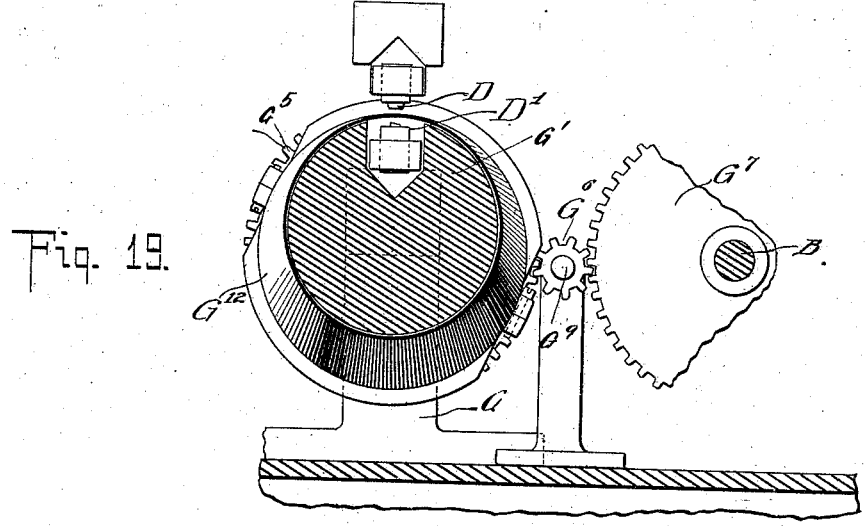

Figure 1 is an end elevation of a machine embodying my invention. Fig. 2 is a side elevation thereof. Fig. 3 is a plan view thereof. Fig. 4 is a detail view of the driving-pulley and its friction-clutch. Fig. 5 is a detail face view of a portion of the feeding devices for feeding the pattern and punches, the same being in section and taken on line 5 5 of Fig. 3. Fig. 6 is a sectional view thereof, the section being taken on line 6 6 of Fig. 3. Fig. 7 is a similar section showing the parts in a slightly-different position. Fig. 8 is a section on line 8 8 of Fig. 3. Fig. 9 is a sectional detail view of parts hereinafter referred to, the section being taken on line 9 9 of Fig. 8. Fig. 10 is a detail view of the punching or note-forming device with its contiguous parts. Fig. 11 is a section on line 11 11 of Fig. 10. Fig. 12 is a rear elevation of the punching or note-forming device and its operating mechanism. Figs. 13, 14, and 15 are detail views of the punching or note-forming device on an enlarged scale. Fig. 16 is a detail view, partly broken away, of a form of device for supporting a note-barrel while the same is being punched. Fig. 17 is a plan view thereof with some of the parts removed for the purpose of clearer illustration. Fig. 18 is a detail view, partly broken away and in section, of the supporting device for the note-barrel, showing the slot in which one member of the punch works. Fig. 19 is a section on line 19 19 of Figs. 16 and 17. Fig. 20 is a section through the feeding device, the same being taken on line 20 20 of Fig. 8.

In the drawings forming part thereof, A, Figs. 2 and 3, is a suitable pattern indented or apertured at proper places for reasons hereinafter set forth. This pattern A is carried upon a suitable power-driven shaft B, to which motion may be communicated in any suitable manner, as by means of a belt $B'$, passing around a pulley $B^2$, secured upon the shaft B by a friction-clutch $B^3$. (See Fig. 4.) Mounted adjacent to the shaft B and preferably parallel thereto is a rod $B^4$. Parallel to this rod $B^4$ is a rod $B^5$, connected to the rod $B^4$ by a bracket $B^6$ and an arm $B^7$. This arm $B^7$ is provided at one extremity with a pivoted forked arm $B^8$, which takes over a shaft $D^{20}$, and with an abutment $B^{18}$, (preferably adjustable,) which contacts with a pivoted arm $D^{28}$ to release the movable member of the clutch, as will be hereinafter fully described.

Hung upon the rods $B^4$ and $B^5$ is a carriage $B^9$, provided with a transverse nut $B^{10}$, through which passes a screw-shaft $B^{11}$, which screw-shaft is stepped in bearings $B^{12}$ $B^{12}$ and provided with a pinion $B^{13}$, which pinion meshes with a gear $B^{14}$, carried upon a shaft E, hung in some fixed part of the machine. This gear $B^{14}$ serves to connect the screw-shaft or feeding device $B^{11}$ and the carriage $B^9$ with the feeding device for the punch, as will be hereinafter fully set forth.

Mounted upon the carriage $B^9$ is an arm $B^{15}$, which arm is provided with a projection or pattern-tracer $B^{16}$, adapted to enter the apertures in the pattern A. C is a note-plate—that is to say, a plate in which notes or playing projections or apertures are to be formed. This note-plate is carried by a shaft $C'$, driven in any suitable manner, such as by means of a connection with the main driving-shaft, which connection is shown in the present instance as a bevel-pinion $C^2$ upon the shaft $C^3$, meshing with a bevel-pinion $B^{17}$, mounted upon the shaft B. Carried also by the shaft $C^3$ is a bevel-pinion $C^4$, which meshes with a bevel-pinion $C^5$ on the shaft $C'$.

The note-plate C projects into the grasp of the two members D $D'$ of the punch. These members D $D'$ are carried by arms $D^2$ $D^3$, which are pivoted at $D^4$ $D^5$ in casings $D^6$ $D^7$. These casings are connected by bearings $D^8$ $D^9$ and plates $D^{10}$. Carried by one of the plates $D^{10}$ is a traverse-nut $D^{11}$, within which works a screw-shaft $D^{12}$, which feeds the punch and which is mounted in a bearing $D^{13}$ and carries a pinion $D^{14}$, which meshes with the gear-wheel $B^{14}$, by which motion is also transmitted to the pinion $B^{13}$.

To the free ends of the pivoted levers $D^2$ $D^3$—that is to say, the ends opposite to the ends carrying the punch members—are attached toggle-levers $D^{15}$ $D^{15}$, to whose point of junction is connected a rod $D^{16}$, which rod works in suitable ways in the bearings $D^8$ $D^9$ and is provided with a pin $D^{17}$, which enters a cam-slot $D^{18}$ in a wheel $D^{19}$, carried upon a shaft $D^{20}$, to which it is secured by a spline. This shaft $D^{20}$ is longitudinally movable in the cam-wheel $D^{19}$ and provided with a clutch member $D^{21}$, which is provided with a spring-bearing $D^{22}$, which serves to force it into engagement with its counterpart, as will be fully set forth. The end of the shaft $D^{20}$ is supported in a bearing $D^{23}$ and carries hung thereon a loose pulley $D^{24}$, to which motion is communicated by a belt $D^{25}$ or other suitable means. Attached rigidly to the pulley $D^{24}$ is the other member $D^{26}$ of the clutch, which co-operates with the member $D^{21}$ on the shaft $D^{20}$. Carried by the member $D^{21}$ of the clutch is an arm $D^{27}$, which normally bears against an arm $D^{28}$, pivotally carried by a standard $D^{29}$ and under control of the arm $B^7$, which control may be effected by any suitable means, such as by means of an abutment $B^{18}$ on the arm $B^7$, which bears against this arm $D^{28}$, a spring $B^{19}$ serving to connect the arm $D^{28}$ with the abutment $B^{18}$ on the arm $B^7$, so as to restore the arm $D^{28}$ to its initial position when the arm $B^7$ is raised.

It will be readily understood that the arm $D^{28}$, receiving the impact of the arm $D^{27}$, will serve to keep the clutch members apart; but when the arm $D^{28}$ is removed from the path of the arm $D^{27}$ the spring-bearing $D^{22}$ will force the member $D^{21}$ into engagement with the member $D^{26}$, and, as the member $D^{26}$ is constantly rotated during operation of the machine, the shaft $D^{20}$ will be thereby rotated.

The manner of removing the arm $D^{28}$ from the path of the arm $D^{27}$ will be set forth hereinafter. The arm $D^{28}$ is restored to its initial position by the return movement of the arm $B^7$, to which it is connected by spring $B^{19}$ and abutment $B^{18}$, which return movement of the arm $B^7$ is accomplished through the medium of a cam $D^{30}$ on shaft $D^{20}$, which co-operates with a pin $B^{20}$ on the arm $B^8$.

Having now minutely described the apparatus for rotating the pattern and the plate to be punched, I will describe their detailed operation before proceeding to describe the construction and operation of the devices for feeding the carriage longitudinally and for moving the punch horizontally—that is to say, feeding them.

Referring particularly to Figs. 2, 3, 8, and 10, we will suppose the machine to be in operation—that is to say, the pattern is being rotated and the loose pulley $D^{24}$ is also being driven. The projection or pattern-tracer $B^{16}$ rides over the surface of the pattern until it falls into an aperture, when the arm $B^7$ will be rocked, bringing the abutment $B^{18}$ in contact with the pivoted arm $D^{28}$, thereby removing the same from the path of the arm $D^{27}$. The clutch member $D^{21}$ is thereupon moved into engagement with its rotating member $D^{26}$ by the action of the spring-bearing $D^{22}$ and the shaft $D^{20}$ is rotated, thereby rotating the cam-wheel $D^{19}$ and moving the rod $D^{16}$ longitudinally, which acts upon the punch through the medium of the toggles $D^{15}$ $D^{15}$, thereby causing the punch to indent or perforate the note-plate A.

It will of course be understood that the shaft $D^{20}$ is rotated very rapidly, or at least with sufficient rapidity to enable the punching or indenting to be accomplished during the short interval in which the projection or pattern-tracer $B^{16}$ will rest in the perforation in the pattern A. In order to bring the shaft $D^{20}$ to rest, after each revolution at a predetermined point, a pin $D^{31}$ is provided upon the clutch member $D^{21}$, which pin will come into engagement with a standard $B^{21}$, when, as the arm $B^7$ is raised by the cam $D^{30}$ co-operating with the pin $B^{20}$, the arm $D^{28}$, rising, will displace the arm $D^{27}$, carried upon the clutch member $D^{21}$ and thereby force the said clutch member $D^{21}$ away from the rotating clutch member $D^{26}$, when the pin $D^{31}$ on the clutch member $D^{21}$ will come in contact with the standard $B^{21}$ and the shaft will be brought to rest.

Having described the method of punching, I will now proceed to describe the mechanism for turning the screw-shafts $B^{11}$ and $D^{12}$, which, as before stated, feed the carriage $B^9$, and the traverse-nut $D^{11}$, which feeds the punch.

Before proceeding to the detailed description I would state that the note-plate or music-disk is designed to operate a number of music-tongues or other devices placed side by side, so that the notes lie in fixed regular predetermined paths concentric with the disk or, in the case of note-barrels, in fixed paths in planes at right angles to the axis of the note-barrel. Now, my machine is designed to punch successively all the notes or playing projections which act upon one tongue—that is to say, in one path—to then proceed to punch all the notes or playing projections which act upon the next tongue—that is to say, the next path—and so on throughout the series. In order to do this, I impart to the pattern one complete revolution, thus punching out all the notes which are to act upon a single tongue. I then shift the pattern-tracer longitudinally, shifting also the punches, and proceed to punch out all the notes or playing projections which are to act upon the next tongue, and so on throughout the series. So, therefore, once in every rotation of the pattern the carriage is fed forward one step, as it were, similar motion being imparted to the punches. This I accomplish by the following mechanism and in the following manner: The gear-wheel $B^{14}$, which serves primarily to feed the carriage and the punches, is carried upon a shaft E, upon which is mounted a ratchet $E'$, with which co-operates one or another of a pair of spring-pawls $e\ e'$, which are carried upon a sliding block $E^2$, working in vertical slides $E^3\ E^4$ and provided with a weight $E^5$, secured thereto by a rod $E^6$. Carried upon the shaft B is a cam $B^{22}$, which co-operates with a pin $E^7$, secured to the sliding block $E^2$, which cam, acting upon the pin $E^7$, serves to raise the block, and with it the weight $E^5$.

The operation of this portion of my invention is as follows: Supposing the parts to be in the position shown in Fig. 5, the rotation of the shaft B serves, through the medium of the cam $B^{22}$ and pin $E^7$, (see Fig. 3,) to raise the sliding block $E^2$, and with it the spring-pawls. As the shaft B continues to revolve, the sliding block $E^2$ will be raised until, when one complete revolution of the shaft has been made, it will occupy the position shown in dotted lines in Fig. 5. Further rotation of the shaft will allow the pin $E^7$ to pass off the highest point of the cam, and the sliding block $E^2$, with its weight, will fall to the position shown in full lines in Fig. 5. As the sliding block falls, the pawl $e'$ will step the ratchet $E'$ around one tooth, thereby turning the shaft E and wheel $B^{14}$, which rotates the pinions $B^{13}$ and $D^{14}$ and feeds the carriage and punches in the manner heretofore described. It will of course be understood that as the sliding block $E^2$ is raised the spring-pawl $e'$ will slide over the teeth of the ratchet $E'$ and be swung on its pivot against the tension of its spring and will not reverse the movement of the ratchet $E'$. If, however, it is desired to reverse the movement of the ratchet $E'$, and consequently the direction of motion of the carriage and the punches, it may be done in the following manner and by the following mechanism: F is a handle carried upon a shaft $F'$, which is hung in some fixed part of the machine. This shaft $F'$ carries a cam $F^2$, which may be swung to move one or the other of the pawls $e\ e'$ into or out of engagement with the ratchet. In Fig. 6 it will be observed that the handle is moved into such position as to allow both pawls to co-operate with the ratchet, and if the handle be further moved in the direction of the arrow, as shown in Fig. 7, the pawl $e$ will be held out of engagement with the ratchet. When, now, it is desired that the rotation given to the ratchet should be in a direction opposite to that formerly described, the handle is swung over into the opposite position, disengaging the pawl $e'$ and engaging the pawl $e$. This pawl $e$ being on the opposite side of the ratchet, it will be evident that as the sliding block descends the pawl $e$ will communicate to the ratchet and its shaft a movement opposite to the direction of the movement previously described.

Having described the detailed operation and interaction of the various groups of co-operating parts, I will now, before describing the modified form of supports for the note-barrel, set forth these detailed operations and interactions in their sequence. We will suppose the machine to be running—that is to say, the shaft B to be rotating and the loose pulley $D^{24}$ to be also rotating. We will further suppose the parts to be in the position shown in Figs. 1, 2, 3, and 8, to which reference is hereby made. As the shaft B revolves it revolves also the pattern under the pattern-tracer $B^{16}$, and the pattern-tracer $B^{16}$ will presently drop into an aperture in the pattern. As this happens the arm $B^7$ will likewise drop, bringing the abutment $B^{18}$ against the lever $D^{28}$ and swinging the said lever to remove its end from the path of the arm $D^{27}$. As soon as the lever $D^{28}$ is moved from the path of the arm $D^{27}$, which formerly rested against $D^{28}$, the spring-coupling $D^{22}$ will force the clutch member $D^{21}$ into engagement with the clutch member $D^{26}$, which is being rotated by the pulley $D^{24}$. The shaft $D^{20}$, to which the clutch member $D^{21}$ is attached, will be thereby rotated, and as it rotates will, through the medium of the cam-wheel $D^{19}$ and pin $D^{17}$, move the rod $D^{16}$ longitudinally to effect the punching. As the shaft $D^{20}$ completes one full rotation, its cam $D^{30}$ will bear against the pin $B^{20}$ on the arm $B^8$, attached to the arm $B^7$, and will raise this pin, raising with it the arm $B^7$, which raises also, through the medium of abutment $B^{18}$ and spring $B^{19}$, the arm $D^{28}$. As this arm $D^{28}$ rises it will, by pressing against the arm $D^{27}$, force the clutch member $D^{21}$ away from the rotating clutch member $D^{26}$, and the pin $D^{31}$ on the clutch member $D^{21}$ will come in contact with the standard $B^{21}$ and stop the rotation of the clutch member $D^{21}$ and its shaft $D^{20}$. As the arm $B^7$ is raised, it of course raises with it the rod $B^5$ and other parts directly connected with the pattern-tracer, lifting also the pattern-tracer out of the perforation in which it has been entered.

I have now described how the motion is communicated from the pattern-tracer to the punches. This action is repeated when, as the pattern A revolves, the pattern-tracer enters the perforations one after another; but in this connection it must be remembered that the perforations in the pattern are placed in paths or lines, which are in planes at right angles to the axis (shaft B) of the pattern-tracer. So, therefore, when the pattern has made a complete revolution the pattern-tracer must be shifted along the line of the axis of the pattern in order that another path or row of perforations may act upon the pattern-tracer, and as the indentations or perforations in the note barrel or plate to be punched must correspond to the indentations or depressions in the pattern the punches must be also correspondingly shifted. So, therefore, after the pattern has made a complete revolution the pattern-tracer and punches must be shifted to position them to make a new set or path of notes. This operation is effected as follows: It will be remembered that the sliding block $E^2$ carries a pin $E^7$, and that the shaft B carries a cam $B^{22}$, which co-operates with the pin $E^7$ to raise the block. It will also be remembered that as the block descends it will step the shaft E around one step. Now, as soon as the pattern-tracer has made one complete revolution from the position shown in the figures referred to the pin $E^7$ will fall from the highest point of the cam to the lowest point thereof, the block $E^2$ also falling and stepping the shaft E around, as aforesaid, turning also the gear-wheel $B^{14}$, which is attached to the shaft, and by means of the pinions $B^{13}$ and $D^{14}$ rotating the screw-shafts or feeding devices $B^{11}$ and $D^{12}$, which, as before explained, feed the carriage for the pattern-tracer and the punches into new positions. The pattern-tracer continuing to revolve, all the notes in this next path are punched, as before described, and when the revolution of the pattern is completed the pattern-tracer and punches are again fed, as described, which operation is repeated until the machine is stopped, which may be done either by hand or automatically, and which does not here enter into consideration.

Referring to Figs. 16 to 19, inclusive, I have there illustrated a means for supporting a note-barrel and rotating the same with respect to the punches, the punches being fed backward and forward, as previously described. This structure, which may be greatly varied, is as follows: Mounted upon some fixed portion of the machine adjacent to the punches—such as the standard G—is a barrel $G'$, in which is cut a slot or groove $G^2$ for the accommodation of one member of the punch, which punch is longitudinally movable, as before described. This barrel is likewise provided with a rib $G^3$, over which is seated a ring $G^4$, freely moving on the barrel and having rigidly attached to or made integral therewith a toothed ring $G^5$. This ring $G^5$ meshes with a pinion $G^6$, which may be driven from the main shaft of the machine in any suitable manner, such as by means of a gear $G^7$, pinion $G^8$, and shaft $G^9$. The barrel $G'$ terminates in a threaded rod $G^{10}$, and a perforated cap $G^{11}$ is provided, which fits over the barrel $G'$ and the note-barrel $G^{12}$ which is to be punched and is firmly held in place on the barrel $G'$ by means of a nut $G^{13}$ on the rod $G^{10}$.

Now, while I have set forth a particular machine and have described the same in specific terms, I would have it understood that I do not mean to thereby limit myself to the specific devices or arrangements shown, as it will be apparent that the devices, their construction and arrangement, may be greatly varied without departing from the spirit of my invention and that other and analogous structures will readily suggest themselves to those who may desire to enjoy the fruits of my invention.

What I claim, and desire to secure by Letters Patent, is—

1. In a machine of the character described, the combination of a pattern, means for rotating the pattern, a pattern-tracer, a punch actuated from the pattern-tracer, feed mechanism for producing relative movement between the pattern-tracer and pattern, and means for effecting the feeding only upon the completion of a rotation of the pattern leaving the feed mechanism inactive during the remainder of the rotation of the pattern, as and for the purposes specified.

2. In a machine of the character described, the combination of a pattern, means for rotating the same, a pattern-tracer, a punch actuated from the pattern-tracer, and a feed mechanism for producing relative movement between the pattern-tracer and the pattern upon the completion of each rotation of the pattern, and means for automatically operating the same from the rotating mechanism for the pattern, as and for the purposes specified.

3. In a machine of the character described, the combination of a pattern, a main shaft therefor constituting the means for rotating the pattern, a pattern-tracer, a punch actuated from the pattern-tracer, and a feed mechanism for producing relative movement between the pattern-tracer and the pattern upon the completion of each rotation of the pattern, and means for automatically operating the same from the main shaft, substantially as and for the purposes specified.

4. In a machine of the character described, the combination of a pattern, means for rotating the same, a pattern-tracer, a punch actuated from the pattern-tracer, an automatic feed mechanism for moving the pattern-tracer relatively to the pattern, and means for actuating the feed-mechanism upon the completion of each rotation of the pattern, as and for the purposes specified.

5. In a machine of the character described, the combination of a cylindrical pattern, means for rotating the same, a pattern-tracer, feed mechanism for moving the pattern-tracer longitudinally of the pattern, and means for automatically operating the said feed mechanism upon the completion of each rotation of the pattern, as and for the purposes specified.

6. In a machine of the character described, the combination of a shaft B, a cylindrical pattern carried thereby, a carriage carrying a pattern-tracer, a punch actuated from the pattern-tracer, a cam on the shaft B and mechanism intervening between the carriage and cam for moving the carriage longitudinally of the pattern, as and for the purposes specified.

7. In a machine of the character described, the combination of a rotating pattern, a pattern-tracer, a punch actuated from the pattern-tracer, feed mechanism for effecting relative movement between the pattern-tracer and pattern, means for actuating the feed mechanism only upon the completion of each rotation of the pattern leaving the said feed mechanism inactive during the remainder of the rotation of the pattern, and means for shifting the punch, as and for the purposes specified.

8. In a machine of the character described, the combination of a main shaft, a pattern carried thereby, a pattern-tracer, a carriage therefor, a screw shaft for moving the carriage relatively to the pattern, a screw shaft for shifting the punch, a shaft E rotated from the main shaft, and connections between the shaft E and the screw shafts, whereby the carriage and punch may be shifted, substantially as described.

9. The combination of a pattern, a movable carriage carrying a pattern-tracer, a punch, mechanism for actuating the punch, a clutch for engaging the mechanism for actuating the punch with a suitable source of power, an arm carried by the carriage for effecting the engagement of the clutch, and a cam upon the clutch shaft for engaging with the arm to allow the clutch members to come together, substantially as described.

10. In a machine of the character described, the combination of a pattern, a pattern-tracer, a punch, a shaft for actuating the punch, a clutch on the said shaft, an arm actuated from the pattern-tracer for effecting the shifting of the clutch, and a cam upon the punch-shaft for restoring the arm to its initial position to release the clutch, substantially as described.

11. In a machine of the character described, the combination of a pattern-tracer, a punch, a shaft for actuating the punch, a clutch on the shaft, an arm as $D^{28}$ for holding the members of the clutch apart, a connection between the arm $D^{28}$ and pattern-tracer, whereby the clutch is controlled from the pattern-tracer, and a cam upon the punch-shaft for restoring the arm $D^{28}$ to its initial position, substantially as described.

12. In a machine of the character described, feeding mechanism for producing relative movement between a pattern-tracer and its pattern, the same consisting of a cam controlled sliding-block, a ratchet, a pawl carried by the sliding-block, and a connection between the ratchet and pattern-tracer, substantially as described.

13. A reversible feeding mechanism, the same consisting of a ratchet, a sliding-block, a cam for moving the sliding-block, a pair of pawls carried by the sliding-block, and mechanism for shifting the pawls to engage one or the other of the pawls with the ratchet, substantially as described.

14. The combination of pivoted levers $D^2$ $D^3$ carrying two members of a punch, a longitudinally movable rod connected to the levers $D^2$ $D^3$ by the links $D^{15}$ $D^{15}$ constituting a toggle mechanism, a pin upon the rod, a shaft adjacent to the rod, a cam mounted upon the shaft, a clutch member carried by the shaft, a spring-bearing connected with the clutch member, another clutch member with which the first mentioned clutch member is adapted to co-operate, a pattern tracer and a connection between the pattern tracer and the first mentioned clutch member, whereby the clutch members will be held apart for predetermined times, substantially as described.

15. The combination of the arms $D^2$ $D^3$ carrying the members of a punch, toggles $D^{15}$ connected to the arms and to a longitudinally movable rod having a projection, a shaft as $D^{20}$ upon which is mounted a cam engaging with the projection on the rod, a clutch carried by the shaft, and means for engaging and disengaging the members of the clutch, substantially as described.

16. The combination of a suitable support as $G'$ provided with a rod as $G^3$, of a ring as $G^4$ hung upon the support and provided with a toothed ring as $G^5$, of a cap as $G^{11}$, and means for securing the cap to the support, whereby a note-barrel may be held between the cap and ring, substantially as described.

17. The combination of a pattern, a pattern-tracer, a movable carriage upon which the pattern-tracer is carried, a punch, a shaft for actuating the same, a laterally movable clutch member carried upon the shaft, an arm for effecting the engagement and disengagement of the clutch member with its mate, the said arm being carried upon the carriage, and a cam for restoring the arm to its initial position, substantially as described.

18. The combination of a pattern-tracer, a punch, a rotating shaft for actuating the punch and clutch member carried upon the shaft, means for shifting the clutch member from the pattern-tracer to actuate the punch, and a stop for arresting the shaft at a predetermined point, substantially as described.

19. The combination of a punch, a shaft for actuating the punch, a movable clutch member on the shaft, a pattern-tracer, an arm actuated from the pattern-tracer for effecting the movement of the clutch member, a cam on the shaft for restoring the arm to its initial position, and a stop for arresting the punch shaft at a predetermined point in its rotation, substantially as described.

20. The combination of a punch, a punch shaft actuating the punch, a movable clutch upon the punch shaft, a spring bearing for moving the same laterally, a pattern-tracer, an arm for holding the clutch against the tension of its spring bearing, mechanism intervening between the arm and the pattern-tracer for actuating the said arm from the pattern-tracer, means actuated from the punch shaft for moving the arm to effect the arrest of the punch shaft, and means for arresting the punch shaft at a predetermined point in its rotation, substantially as described.

21. The combination of a pattern-tracer, a punch, a punch shaft for actuating the said punch, a movable clutch member upon the punch shaft, a pin upon the clutch, mechanism for moving the clutch controlled by the pattern-tracer, and a fixed stop for co-operating with the pin on the clutch to arrest the shaft at a predetermined point in its rotation, substantially as described.

PATRICK KENNEDY.

Witnesses:
HARRY M. TURK,
GEO. E. MORSE.